INVENTOR.
Robert M. Fachini
By John J. Kowacik
Attorney

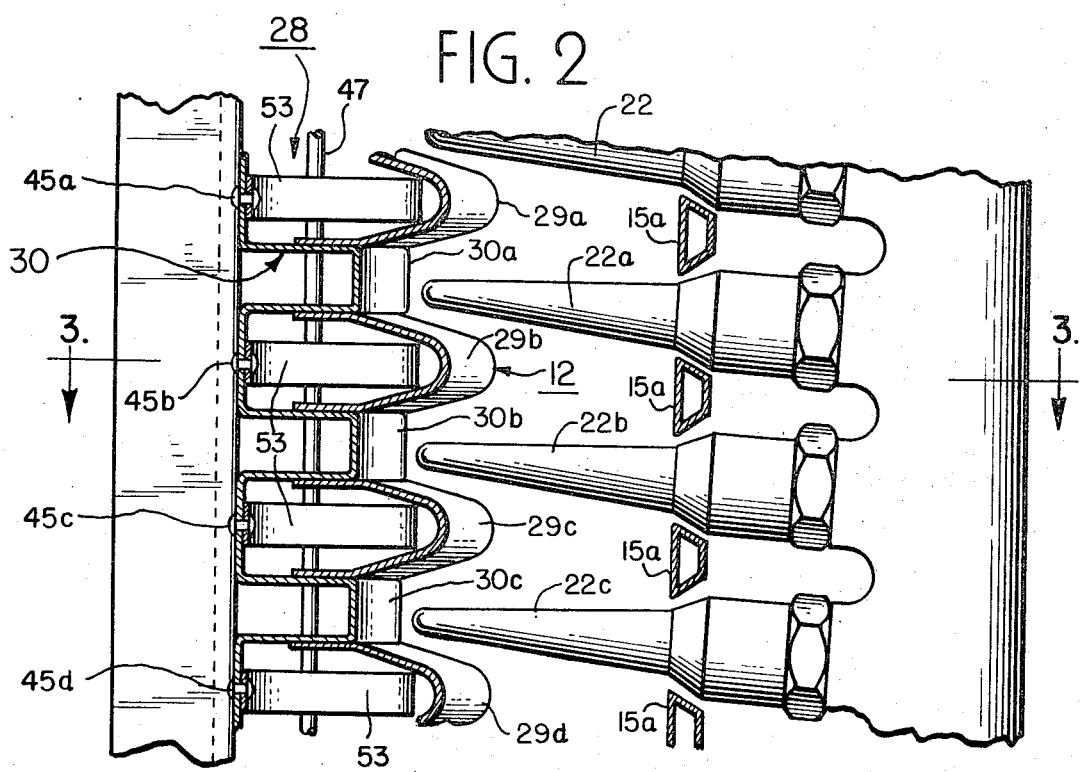
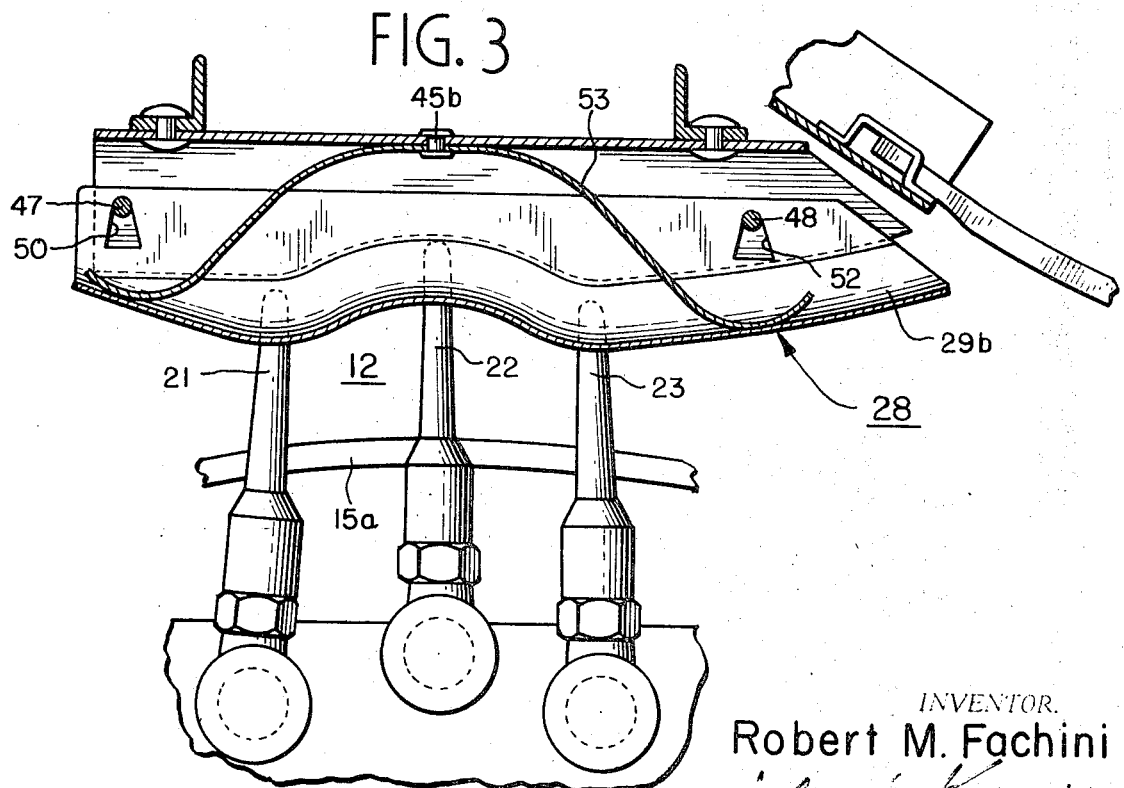

United States Patent Office 3,528,232
Patented Sept. 15, 1970

3,528,232
COMPRESSION SHEET STRUCTURES, ROD AND CORRUGATED TYPES
Robert M. Fachini, Memphis, Tenn., assignor to International Harvester Company, Chicago, Ill., a corporation of Delaware
Filed Apr. 19, 1968, Ser. No. 722,706
Int. Cl. A01d *45/20*
U.S. Cl. 56—44          11 Claims

ABSTRACT OF THE DISCLOSURE

A multi-element compressor plate structure for non-destructively urging cotton plants into the effective picking zone of a series of picker spindles is disclosed.

A cotton harvesting machine has a plant receiving passageway and a plurality of picker spindles spaced vertically one from another and extending laterally into the plant receiving passageway through a first generally vertical sidewall thereof. The compressor plate structure defines an opposite sidewall of the passageway and is composed of a series of yieldably biased members normally projecting laterally inward into interdigitation with the vertically spaced array of picker spindles for yieldably compressing cotton plants into the effective picking zone of the spindle arms.

BACKGROUND OF THE INVENTION

The present invention relates generally to cotton harvesting machines and, more particularly, to a new and improved compressor plate apparatus for yieldably and nondestructively compressing cotton plants within the picking zone of the harvestig machine.

Typically a cotton harvesting machine includes an upright picker housing that is advanced along rows of cotton plants during the course of the picking operation. A V-shaped inlet of the housing guides the upright cotton plants into a narrowed plant receiving passageway whereat the picking operation is effected. To this end, there is provided adjacent one side of the passageway a number of banks of picker spindles, each bank composed of a plurality of picker spindles or fingers spaced one from the other in a common vertical plane. The spindle banks are tracked in an orbital path about the periphery of a rotor drum such that during respective portions of their rotational cycles the spindles of each bank are laterally extended into the plant passageway, cotton entwined thereon and the spindles then withdrawn from the picking zone of the passageway. A doffer apparatus thereafter removes the cotton from the spindles and the spindles are moistened to eliminate the secretive juices of the plants therefrom and prepare them for a successive picking operation.

In order that the picker spindles are provided full access to the lateral extent of the cotton plant as is necessary for efficient picking, it is required that the plant be compressed in the passageway, preferably to a width that does not substantially exceed the effective picking length of the spindle arms. On the other hand, cotton fields are harvested several times during the course of each growing season, and for this reason, the plants cannot be compressed to such an extent that they are permanently damaged or injured. In an effort to solve this problem, the prior art has spring biased the passageway wall opposite that of the spindles such that a predetermined pressure will cause it to yield outwardly before the plane is seriously damaged. Another prior art structure takes limited recognition of the fact that cotton plants mature gradually from the bottom up and therefore divides the compressor plate into an upper and lower spring biased section with only the lower section being brought to bear against the plants during early season harvesting operations.

Although prior art structures as those described above generally prevent significant injury to the cotton plants, it has been found that unusually bulky portions of perhaps a single cotton plant may effect a full outward displacement of the wall thereby preventing access of the spindle arms to remaining portions of the same or other plants capable of withstanding a further compression without injury. Furthermore, the various compressor plate wall structures of the prior art are not suited to effect a compression of the plant to a width shorter than the maximum axial length of the spindle arms. Thus, those portions of the plant at or slightly beyond the lateral extent of the picker spindles are not even exposed to a picking action.

SUMMARY OF THE INVENTION

It is therefore a primary object of the present invention to provide a new and improved compressor plate structure that effects a denser compression of the cotton plants than prior art structures without any attendant increase in the probability of injury to plants.

It is another object of the present invention to provide a compressor plate structure which provides an effective biasing or urging of the cotton plant inwardly of the outermost extent of the spindle arms.

It is a further object of the present invention to provide a compressor plate structure capable of substantially a universal movement in a horizontal plane such that an outward pressure at, for example, the entry of the passageway does not result in a material outward displacement of the structure adjacent the exit of the passageway.

It is a more specific object of the present invention to provide a plurality of spring biased members adapted to interdigitate with the vertically spaced spindles of a spindle bank in the plant receiving passageway.

Accordingly, the present invention relates to a cotton harvesting machine of the type having a plant receiving passageway and further having a plurality of picker spindles spaced vertically one from another and adapted to extend laterally into the passageway through a generally vertical sidewall thereof. Specifically, the invention is directed to a compressor plate means defining an opposite sidewall of the passageway and comprising a series of yieldably biased members substantially corresponding in number to the plurality of vertically spaced picker spindles for nondestructively urging the plant toward the picking spindles.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

FIG. 2 is a sectional view taken along lines 2—2 of FIG. 1;

FIG. 3 is a sectional view taken along lines 3—3 of FIG. 2;

DESCRIPTION OF THE PREFERRED EMBODIMENTS

Figure 1:
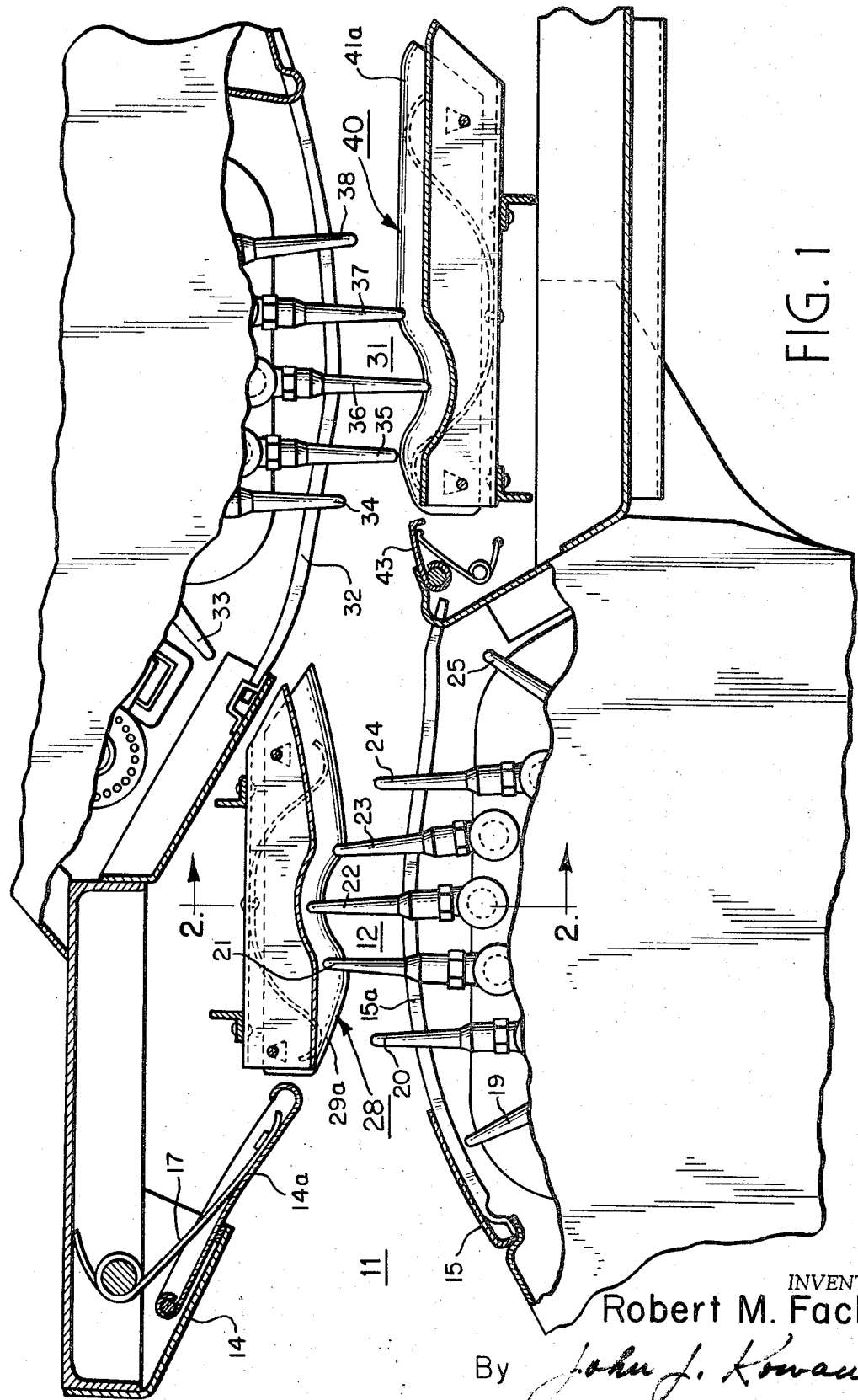
FIG. 1 is a longitudinal section with parts broken away, of a cotton harvesting machine embodying a preferred form of the present invention.

Referring to FIG. 1, the portion of the cotton harvesting machine there illustrated is generally conventional except for the compressor plate structure of the present invention. The operation and complete structure of such a cotton harvesting machine is now well known to the art and is disclosed, for example, in U.S. Pat. 2,140,631, Johnston, assigned to the same assignee as the present invention.

Briefly, the machine comprises a V-shaped inlet passage 11 for guiding the cotton plants toward a narrow plant receiving passageway 12 whereat an initial picking operation occurs. The contour of the inlet zone 11 is defined by a pair of opposed wall sections 14 and 15 which converge in a direction toward the plant receiving passage 12. The wall 14 includes an extended section 14a which is normally biased against a stop positioned on the interior of the fixed wall section 14 by a hairpin type spring 17.

A first sidewall of the plant receiving passageway 12 is formed by the continuation 15a of the inlet wall 15. As will presently become apparent, the wall section 15a is composed of a series of horizontal slats vertically spaced one from the other so as to permit access of the picker spindles through this sidewall and into the picking zone of the passageway 12.

As earlier discussed, the picker spindles are arranged in a number of banks and are spaced about the periphery of a rotor drum (not shown). Each bank includes a plurality of laterally extending spindles spaced vertically one from the other in a common vertical plane and adapted to register with the openings in the slatted wall 15a. The uppermost spindles 19–25 in a respective series of spindle banks are visible in the plan view of FIG. 1. The progression of the picker spindles into the plant passageway and their eventual withdrawal therefrom may be appreciated from viewing the positions occupied by the spindles 19–25 of the successive spindle banks. As shown, the spindles are gradually inserted into the passageway 12 in a direction transverse to the axis thereof until a maximum penetration depth is reached, as illustrated by the position of the spindle 22, after which the spindles are gradually withdrawn from the passage at a slight negative rake angle. As is well known in the art, the rotational speed of the rotor drum to which the spindle banks are mounted is maintained in a predetermined correspondence to the rate of advancement of the cotton harvesting machine through the field to the end that the spindles experience little, if any, longitudinal movement with respect to the cotton plants.

The picking operation is effected by rotation of the barbed picker spindles about their own longitudinal axes which causes cotton coming into contact with the spindles to be entwined thereabout and removed from the plant. The entwined cotton is eventually removed from the picker spindles by conventional doffer apparatus (not shown) after withdrawal of the spindles from the picking zone. The secretive juices of the plant are washed from the spindle and the spindle moistened as it approaches the passageway reentry position depicted by the spindle 19.

With an arrangement of the foregoing type, it will be appreciated that the cotton plant must be brought into intimate contact with the picker spindles in order for an efficient and complete picking action to occur. This result is obtained by the converging walls of the inlet zone 11 which effect a gradual initial compression of the cotton plant and by the compressor plate structure of the present invention, denoted generally in the drawing by the reference numeral 28. As will be explained in greater detail later herein, the compressor plate structure 28 defines a sidewall of the plant passageway 12 opposite to that of the first wall 15a and is comprised of a series of yieldably biased members vertically aligned below an uppermost member 29a. All of these members, like 29a, have a leading edge contour approximately collinear with the inlet wall 14a, a scalloped central portion and a terminal edge contour gradually flaring outwardly toward the passageway exit. The scalloped central portion is of a concave curvature such that the extent of interdigitation or overlap of the spindles and biased members is approximately a constant optimum distance through the central zone of the passageway 12. In other words, it is not necessary or particularly desirable to establish an innermost lateral position for the biased members that forces the cotton plants excessively toward the shank of the spindle since the desired full spindle access is provided by merely displacing the plants slightly inwardly of the spindle tips.

The illustrated cotton harvesting machine further includes, as is conventional, a second picker assembly substantially identical to that just described. However, the picker spindles of the second unit extend into their associated passageway from a lateral direction opposite to that of the spindles in the first picker unit. The second picker unit, as is well understood in the art, is intended to recover any suitably ripened cotton that for one reason or another was not removed by the first picker assembly.

Briefly, the second picker assembly includes a plant receiving passageway 31, a first sidewall portion thereof being defined by a slatted wall 32 substantially identical to wall 15a. Similarly, a number of bank picker spindles are mounted in spaced relation about the periphery of a rotor drum (not shown) and are adapted for periodic insertion into and withdrawal from the passage 31 during the course of the picking operation. Only the uppermost spindles 33–38 in each of a series of respective spindle banks are visible in FIG. 1.

The sidewall of the passage 31 opposite to that of the first sidewall 32 is again defined by a compressor plate structure 40 according to the present invention which structure is substantially identical in construction to that of the structure 28. The uppermos spring biased member 41 of the structure 40 is visible in FIG. 1 and, as will be noted, its leading or forward edge portion, as well as the leading edges of the members aligned vertically below it, are in approximate collinear alignment with a unitary or solid sheet compression plate structure 43. The compression plate 43 and the opposed portion of the sidewalls 32 converge as the passageway 30 is approached to define a narrowing inlet therefor.

A more complete understanding of the preferred embodiment of the present invention may be had by reference to FIGS. 2 and 3. The compressor plate structure 28 as there shown comprises a series of yieldably biased members 29a–d each spaced vertically one from the other (FIG. 2) and extending horizontally from a forward to a terminal end of the passageway 12 (FIG. 3). Preferably, the yieldably biased members 29a–d substantially correspond in number to that of the picker spindles 22–22c and furthermore are preferably constructed and arranged for interdigitation with the plurality of spindle arms. In this regard, the expression "interdigitation" as used in the present specification and the appended claims is intended to denote that the yieldably biased members are vertically positioned intermediate respective pairs of the spindle arms and furthermore that they extend laterally inward into overlapping relation with the tips of the adjacent spindle pairs.

The spring biased members of the present embodiment are separated one from the other by a series of fixedly positioned bar members 30a–c stacked in vertical alternation with the spring members 29a–d. The fixedly positioned members are located directly opposite respective ones of the spindle arms 22–22c and are spaced a predetermined short distance beyond the outermost tips of the respective spindle arms. The fixed members 30a–c, along with companion members not visible in the fragmentary drawing of FIG. 2, define a maximum width for the passageway 12. In other words, once the yieldably biased members have been displaced outwardly to a position in which their leading edges are tangent to the vertical plane defined by the faces of the members 30a–c, the wall structure 28 will yield no further and the cotton plants are inevitably confined to this maximum passageway space.

The fixed members 30a–c of the present embodiment are actually part of a continuous metal bracket, denoted generally by the reference numeral 30, having a repetitive pattern of oppositely facing U-shaped bends therein. The bracket 30 is mounted along its backside to the frame of the harvesting machine by a series of fasteners, such as 45a–d.

The bracket 30 also serves as an aid in mounting and locating the yieldably biased members 29a–d. Specifically, the spring members 29a–d are generally of a V-shaped cross section in a vertical plane, as is visible in the drawing of FIG. 2, but with the terminal leg portions of each member being bent parallel one to the other so as to lie contiguous respective ones of opposed pairs of the internal sidewalls of the continuous bracket 30. The internal sidewalls of the bracket generally guide and locate the spring members 29a–d and furthermore the contiguous relationship between the fixed and yieldably biased members assures that there are no open crevices or the like in the wall structure 28 for snaring the cotton plants with resultant damage to the plants and/or fouling or blocking of the plant passageway 12.

The limits and pattern of the lateral movement of the yieldably biased members 29a–d is established by the selected biasing arrangement therefore and, in accordance with the present invention, it is preferred that members 29a–d be capable of a somewhat universal movement in a horizontal plane, i.e., the members not be confined to angular displacement about a single vertical axis or restricted solely to movement perpendicular to the longitudinal axis of the passageway 12. To this end, the members 29a–d are each provided with vertically aligned pairs of guide apertures in their upper and lower surfaces, each aperture pair being adjacent a respective end of its associated member. As exemplified by the member 29b visible in FIG. 3, the typical guide apertures 50 and 52 are of a triangular configuration with vertically extending locating posts 47 and 48, respectively, loosely journaled therein. The posts 47 and 48 normally abut one end of the respective guide slots in the members 29a–d due to the inward biasing influence of a series of individual springs for these members, as exemplified in FIG. 3 by the center mounted leaf spring 53 for the member 29a. The ends of the spring 53 merely contact the member 29a and are not affixed thereto.

The nature of the spring 53 and the post and slot guide arrangement permits the members 29a–d to be displaced angularly about various vertical axes depending on the location of the applied pressure as well as in a direction perpendicular to the longitudinal axis of the passageway 12. Furthermore, an applied pressure on any of the members 29a–d near the forward end of the passageway 12 will not effect a substantial outward displacement of the corresponding member at, for example, the exit of the passageway 12. The capability of the yieldably biased members for a somewhat universal movement in a horizontal plane has been found desirable since it prevents an unusually bulky portion of a cotton plant at one point in the passageway 12 from displacing the biased member to its maximum outward extent along its full length thereby disrupting or reducing the efficiency of the picking operation at other points in the passageway.

The above described biasing structure is merely exemplary of one form of convenient and economical arrangement that may be employed to provide the desired degree of freedom to the members 29a–d. Those skilled in the art will recognize that other conventional biasing structures may provide equally satisfactory results. Furthermore, more sophisticated arrangements may be employed to increase the freedom of movement of the members 29a–d, if desired.

Figure 4:
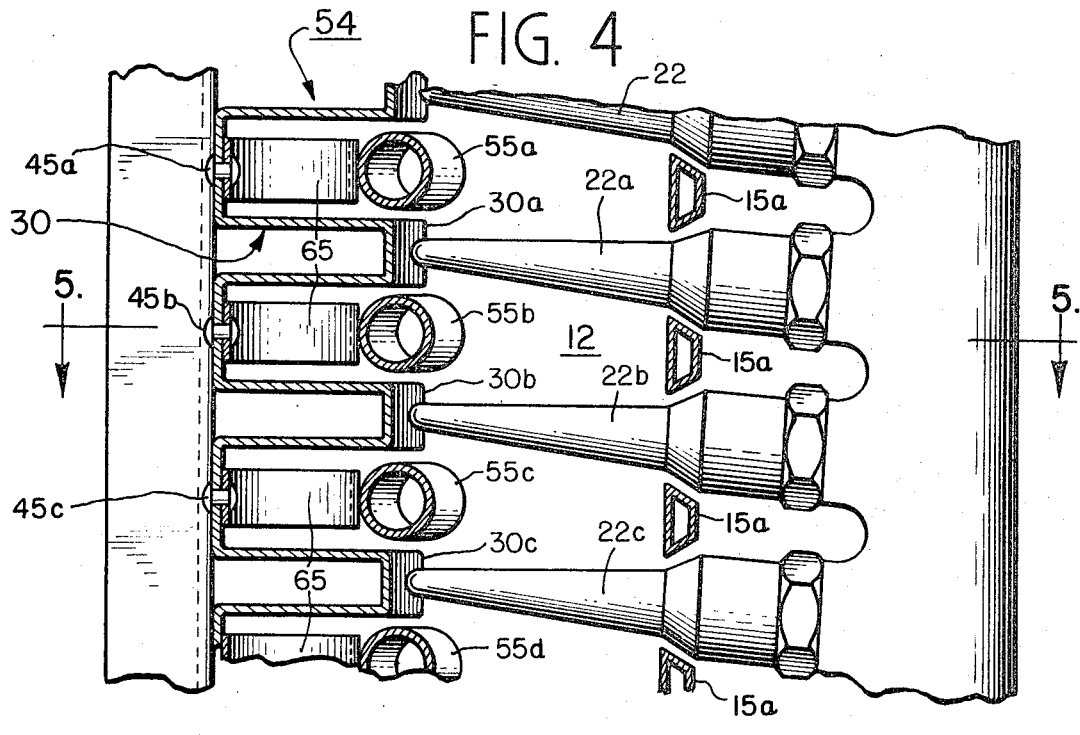
FIG. 4 is a sectional view similar to that of FIG. 2 but illustrating an alternate embodiment of the present invention.
Figure 5:
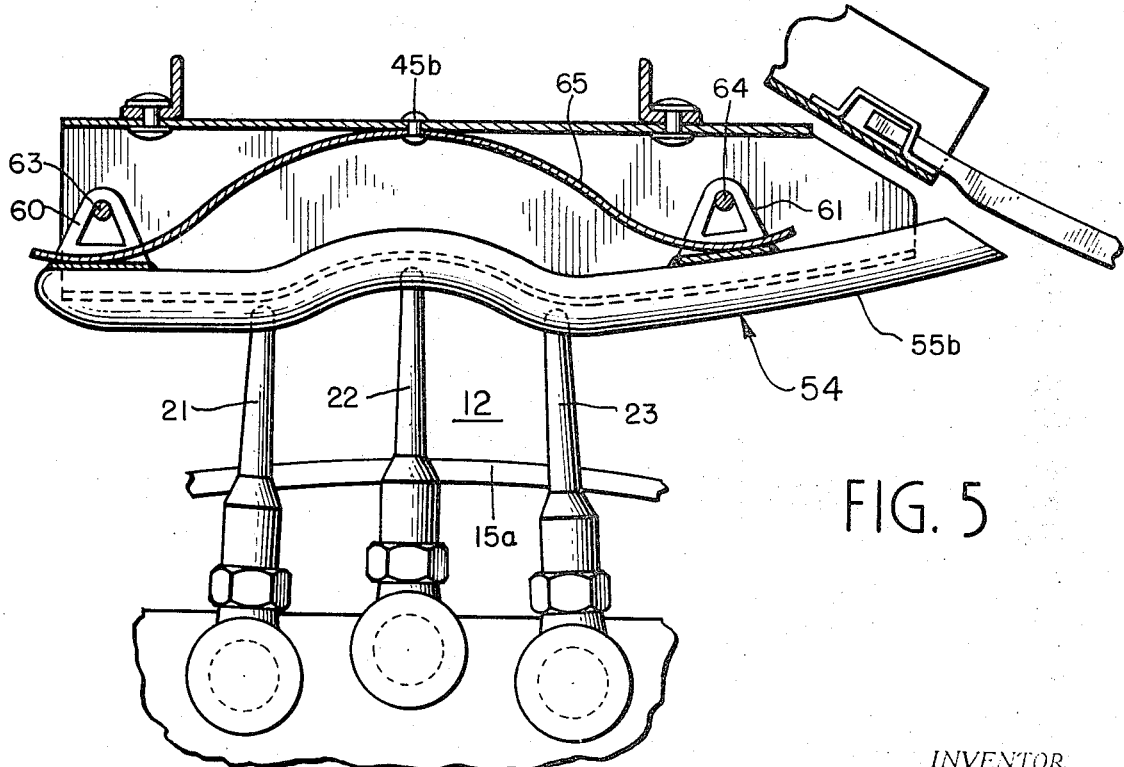
FIG. 5 is a sectional view taken along lines 5—5 of FIG. 4.

An alternate embodiment of the invention is illustrated in FIGS. 4 and 5. This embodiment is generally similar to that previously described in conjunction with FIGS. 1–3 excepting that the yieldably biased members 55a–d of this embodiment are of a tubular configuration having a diameter somewhat smaller than the spacing between the adjacent internal sidewalls of the continuous bracket 30. Each of the spring biased members 55a–d is mounted in a fashion similar to that of the yieldably biased members of the embodiment of FIGS. 1–3.

Specifically, and as exemplified by the yieldably biased member 55b visible in FIG. 5, there are provided a pair of U-shaped brackets 60 and 61 fixedly mounted to the member 55a adjacent its opposed end portions. The brackets 60, 61 are provided with similar triangularly-shaped guide apertures in their respective opposed leg portions through which there are loosely journaled individual ones of a pair of locating rods on posts 63 and 64. A center mounted leaf spring 65 engages the backside of the member 55a approximately intermediate the leg portions of the brackets 60 and 61, respectively. The spring 65 normally displaces the member 55a laterally inward toward passageway 12 such that the vertical locating posts 63 and 64 abut respective apices of the brackets 60 and 61.

The yieldably biased members 55a–d function in a manner substantially identical to that of the yieldably biased members of the preferred embodiment of the invention illustrated in FIGS. 1–3. The members 55a–d are individually displaced outward in proportion to the magnitude of the reaction force developed by the compressed cotton plants. The maximum outward displacement of the members is defined by the lateral extent of the guide apertures in the brackets 60 and 61 and, in the present embodiment, corresponds to the distance by which the biased members extend inwardly of the faces of the fixed members 30a–c. Thus, when displaced to their maximum outward extent the yieldably biased members lie approximately tangent to the plane defined by the vertical faces of the fixedly positioned members of the wall structure. The angle between the diverging sides of the triangular apertures defines and limits the degree of angular or rotational freedom for the spring members. Although of comparative ease and economy in manufacture, this embodiment is not preferred since cotton plants may become snarled in the open grillwork of the wall structure 54.

While particular embodiments of the present invention have been shown and described, it is apparent that various changes and modifications may be made, and it is therefore intended in the following claims to cover all such modifications and changes as may fall within the true spirit and scope of this invention.

I claim:
1. In a cotton harvesting machine of the type having a plant receiving passageway and further having a plurality of picker spindles disposed in horizontal rows spaced vertically one from another and defining a plurality of horizontally disposed spaces, said spindles adapted to extend laterally into said passageway through a first generally vertical sidewall thereof, the improvement comprising:

compressor plate means defining an opposite continuous sidewall of said passageway and comprising a series of elongated yieldably biased members substantially corresponding in number to said plurality of spaces for nondestructively urging said cotton plants toward said picker spindles, and means biasing each member at a plurality of longitudinally displaced areas and mounting the same for individual rocking and translational movements throughout its entire extent in substantially horizontal planes and urging the same into the respective space.

2. The improvement of claim 1 and further including secondary, rigid wall means spaced laterally outward from said opposite sidewall for effectively defining a maximum width for said plant receiving passageway.

3. The improvement of claim 2 in which said substantially rigid, secondary wall means comprises a series of horizontally extending metal bars interposed in alternation between said series of yieldably biased members.

4. The improvement of claim 3 in which said substantially rigid secondary wall means is positioned laterally outward beyond the maximum longitudinal extent of said picker spindles and in which said yieldably biased members normally extend laterally inward into interdigitation with said picker spindles.

5. The improvement of claim 4 in which said yieldably biased members are adapted for substantially universal movement in a horizontal plane under the influence of a predetermined pressure less than that calculated to cause permanent injury to the cotton plants confined to said passageway, and means for centering said members.

6. The improvement of claim 5 in which said rigid bars are in lateral alignment with respective ones of said picker spindles and are spaced a predetermined minimum distance beyond the maximum longitudinal extent of said spindles.

7. The improvement of claim 6 in which said yieldably biased members are generally V-shaped in vertical cross section and have top and bottom portions converging toward the space between respective rows of spindles.

8. The improvement of claim 7 in which said yieldably biased members and said fixed members are contiguous one to the other to form a substantially continuous vertical sidewall for said passageway.

9. The improvement of claim 6 in which said yieldably biased members are substantially circular in vertical cross section and are spaced from said rigid bars.

10. In a cotton harvesting machine of the type having a plant receiving passageway and further having a plurality of picker spindles spaced vertically one from another and adapted to extend laterally into said passageway through a generally vertical sidewall thereof, the improvement comprising:
compressor plate means defining an opposite continuous sidewall of said passageway and comprising a series of elements movable transversely of the passageway and stacked in vertical alternation with a series of fixed positioned members, said elements extending a predetermined distance inwardly into said passageway beyond said members, and bowed leaf spring means having a center portion bearing against an adjacent fixed member and end portions bearing against opposite ends of the respective element spaced lengthwise of the passageway.

11. The improvement of claim 10 in which said elements are constructed and arranged to normally project into interdigitation with said plurality of picker spindles.

References Cited
UNITED STATES PATENTS

| | | | |
|---|---|---|---|
| 1,078,328 | 11/1913 | Appleby | 56—47 |
| 1,926,337 | 9/1933 | Johnston | 56—44 |
| 2,058,513 | 10/1936 | Rust et al. | 56—42 |
| 2,576,567 | 11/1951 | Brown | 56—44 |
| 2,669,081 | 2/1954 | Weems et al. | 56—47 |
| 2,837,886 | 6/1958 | Beach et al. | 56—42 |
| 3,082,590 | 3/1963 | Keith | 56—42 |
| 3,103,092 | 9/1963 | Templeton | 56—44 |
| 3,169,359 | 2/1965 | Nickla et al. | 56—44 |
| 3,175,346 | 3/1965 | Tracy et al. | 56—44 |
| 3,406,507 | 10/1968 | West | 56—44 |

LOUIS G. MANCENE, Primary Examiner

J. O. OLIFF, Assistant Examiner